US006871069B1

(12) United States Patent
Cho

(10) Patent No.: US 6,871,069 B1
(45) Date of Patent: Mar. 22, 2005

(54) METHOD FOR MANAGING A FOREIGN MOBILE SUBSCRIBER IN VLR OF A MOBILE SWITCHING CENTER

(75) Inventor: Il-Won Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 349 days.

(21) Appl. No.: 09/664,507

(22) Filed: Sep. 18, 2000

(30) Foreign Application Priority Data

Sep. 17, 1999 (KR) ........................................ 1999-40018

(51) Int. Cl.⁷ .............................................. H04Q 7/20
(52) U.S. Cl. .................................. 455/433; 455/432.1
(58) Field of Search ................................ 455/433, 432, 455/426, 406, 445, 411, 461, 422, 432.1, 432.3, 432.2, 435.1, 435.2, 426.1, 410, 422.1, 436, 456.1

(56) References Cited

U.S. PATENT DOCUMENTS

| | | | | |
|---|---|---|---|---|
| 5,699,408 A | * | 12/1997 | Krolopp et al. ............. | 455/411 |
| 5,978,678 A | * | 11/1999 | Houde et al. ............... | 455/433 |
| 6,006,094 A | * | 12/1999 | Lee ............................. | 455/445 |
| 6,094,578 A | * | 7/2000 | Purcell et al. .............. | 455/426 |
| 6,097,950 A | * | 8/2000 | Bertacchi .................... | 455/432 |
| 6,233,457 B1 | * | 5/2001 | Wiehe ......................... | 455/445 |
| 6,259,914 B1 | * | 7/2001 | Koster ......................... | 455/432 |
| 6,408,173 B1 | * | 6/2002 | Bertrand et al. ............ | 455/406 |

FOREIGN PATENT DOCUMENTS

| | | | | |
|---|---|---|---|---|
| AU | 7750033 | * | 3/2001 | ............ H04Q/7/38 |

* cited by examiner

Primary Examiner—Rafael Perez-Gutierrez
(74) Attorney, Agent, or Firm—Cha & Reiter, L.L.C.

(57) ABSTRACT

Disclosed is a method for managing a foreign mobile subscriber in a visitor location register (VLR) of a mobile switching center (MSC) to provide a roaming service. The method comprising, upon receipt of a call request from a mobile terminal, checking a mobile country code (MCC) and a mobile network code (MNC) of an international mobile subscriber identification (IMSI) number received from the mobile terminal, to determine whether a subscriber of the mobile terminal is a foreign mobile subscriber; checking, when the subscriber is a foreign mobile subscriber, a country code index table of the VLR to determine whether there exists a number of the country for which the roaming service is established; checking, when there exists the number of the country for which the roaming service is established, a service provider index table to determine whether the service provider is a roaming service provider; and providing, when the service provider is a roaming service provider, the service while managing the corresponding number in the order of the country code index table number, the service provider index table number and a mobile station identification number (MIN).

6 Claims, 7 Drawing Sheets

METHOD FOR MANAGING A FOREIGN MOBILE SUBSCRIBER IN VLR OF A MOBILE SWITCHING CENTER

CLAIM OF PRIORITY

This application makes reference to and claims all benefits accruing under 35 U.S.C. Section 119 from an application for METHOD FOR MANAGING A FOREIGN MOBILE SUBSCRIBER IN VLR OF A MOBILE SWITCHING CENTER filed earlier in the Korean Industrial Property Office on Sep. 17, 1999 and there duly assigned Serial No. 40018/1999.

BACKGROUND OF THE INVENTION

1. Field of the Invention

The present invention relates generally to a method for managing a roaming subscriber in a VLR (Visitor Location Register) of a mobile switching center. More particularly, the present invention relates to a method for managing a foreign mobile subscriber in the VLR of a mobile switching center.

2. Description of the Related Art

In general, a mobile switching center (MSC) includes a first database for storing location information and the call details of a mobile terminal. The MSC is also connected to a second database in which information about a subscriber registered in its mobile communication service is stored. The first database in the MSC for storing the location information and the call details of the mobile terminal is called a VLR (Visitor Location Register), and the second database for storing subscriber information for the service of the MSC is called an HLR (Home Location Register). A network structure including such databases will be described with reference to FIG. 1.

FIG. 1 illustrates an MSC network structure including the VLR and the HLR. The structure and operation of the MSC network will be described below with reference to FIG. 1.

A mobile communication system includes MSCs, VLRs included in the respective MSCs, and an HLR having information about the subscribers registered in the MSC service provider. Each HSC is connected to a plurality of base station controllers (BSCs), and each BSC is connected to a plurality of base transceiver stations (BTSs). The BTSs are divided into their unique areas and perform radio communication with the mobile terminals of subscribers located in their areas. Therefore, a plurality of MSCs 100 and 200 are connected to one HLR 300, and each MSC includes its own VLR.

As shown in FIG. 1, the MSC 200 is connected to the BSCs 20–22, and the BSC 21 is connected to the BTSs 10–12. The BTS 10 performs communication with mobile terminals A11–A13 located in the area A. The BTS 11 performs communication with mobile terminals B11–B13 located in the area B. The BTS 12 performs communication with mobile terminals C11–C13 located in the area C. Furthermore, the respective MSCs 100 and 200 are connected a public switched telephone network (PSTN) 400 or an Internet network 500 for communication with them.

The mobile communication service provider establishes the BTSs, taking into consideration of the call quality and the number of the subscribers. Therefore, there is a case where a greater number of BTSs are established in a specific area while a smaller number of BTSs are established in another area. In this case, the area in which a smaller number of BTSs are established may have a non-serviceable zone. Hence, when a specific subscriber is located in the non-serviceable area, the subscriber is unable to make a call connection.

In order to circumvent the problem of subscribers being unable to make call when outside the serviceable area, different mobile communication service providers sometimes have an agreement between them to provide a roaming service so as to provide the subscriber's terminals of the other service providers with the communication service.

For example, referring to FIG. 1, if the subscriber B12 located in the area B is not registered in the HLR 300 but registered with another service provider, which has made an agreement on the roaming service with the service provider of subscriber B12, then the subscriber B12 can reasonably receive communication service via the service provider of the other company. This will be described below from the viewpoint of the VLR 250.

The mobile terminal uses a prescribed mobile subscriber identification number system, called "IMSI (International Mobile Subscriber Identification)", for location registration. The IMSI number system is classified as shown in Table 1 below.

TABLE 1

| | | MIN | | |
|---|---|---|---|---|
| MCC | MNC | PLMN | PFX | Random No. |
| 3 Digits | 2 Digits | 3 Digits | 3 Digits | 4 Digits |

As shown in Table 1, the IMSI system is comprised of a mobile country code (MCC), a mobile network code (MNC), and a mobile station identification number (MIN). The MIN is comprised of a public land mobile network (PLMN) which is a service provider's number, a prefix PFX which is an office number, and a random number which is an individual identification number. That is, the mobile terminal performs location registration by transmitting the above 15-digit information to the BTS, and can receive the service from the service provider of another company.

However, not all the data provided from the mobile terminal is used when registering the data in the VLR. This will be described with reference to FIG. 2.

FIG. 2 is a table diagram for explaining a location registration and the search routine of a mobile terminal in the VLR according to the prior art. The location registration and the search routine of the mobile terminal will be described in detail below with reference to FIGS. 1 and 2.

Up until now, the national mobile communication service providers have not provided the roaming service to a foreign (i.e., internationally based) mobile communication service providers. Therefore, when a unique identification number of the mobile terminal is received at the VLR according to the IMSI system, it is determined whether the subscriber is a national subscriber, depending on the MCC and the MNC. When the subscriber is not a national subscriber, the corresponding data is discarded.

However, when the subscriber is a national subscriber, depending on the 3-digit PLMN, the VLR determines whether the subscriber is its own service subscriber or a roaming service subscriber. First, for the received PLMN data, a prefix index value is checked using a prefix table. That is, as shown in FIG. 2, an index "0" is assigned to a prefix "011," an index "1" to a prefix "012" and an index "2" to a prefix "013."

When the IMSI number received from the mobile terminal is "450 00 011 123 1234", the MCCM+MNC number "450 00" is discarded and then the index number is searched using the number "011." As shown in FIG. 2, the number "011" corresponds to the index number "0." Accordingly, a method for searching subscriber data from the index table using the searched index number "0" for the number "011" can be calculated in accordance with Equation (1) below:

$$LDN = (\text{Index Value}) \times 10000000 + (PFX \text{ random No.}) \quad (1).$$

If this is substituted into Equation (1), then LDN= "0*10000000+1234567." Therefore, a value "01234567" is obtained by performing the calculation. The corresponding data is searched from the INDEX-0 area of FIG. 2 using the subscriber's phone number. Alternatively, when the IMSI number received from the mobile terminal is "450 00 012 123 1234", the index number becomes "1" in the above method, and a value "11234567" is obtained by performing the calculation of Equation (1). The VLR of the existing mobile communication system manages the mobile subscribers using this method.

It is possible to use such a method when providing the communication service to national (or domestic) subscribers only. However, when providing the roaming service to a subscriber of a foreign service provider as frequently requested these days, it is not possible to manage the data utilizing the present method. In order to solve this problem, the service provider needs to change the overall existing system, which, however, requires enormous expense.

SUMMARY OF THE INVENTION

It is, therefore, an object of the present invention to provide a method for managing a foreign mobile subscriber, while maximally maintaining the VLR structure of the existing mobile communication system and minimizing a modification of the system design.

To achieve the above and other objects, there is provided a method for managing a foreign mobile subscriber in a visitor location register (VLR) of a mobile switching center (MSC) to provide a roaming service.

In an embodiment of the invention, a method for managing a foreign mobile subscriber in a visitor location register (VLR) of a mobile switching center, (MSC) to provide a roaming service, comprising the steps of:

(a) upon receipt of a call request from a mobile terminal, determining whether a subscriber of the mobile terminal is a foreign mobile subscriber by checking a mobile country code (MCC) and a mobile network code (MNC) of an international mobile subscriber identification (IMSI) number received from the mobile terminal;

(b) determining whether a number of the mobile country code country for which roaming service is established by checking if the country code received from the foreign mobile subscriber exits in a country code index table of the VLR when the subscriber in step (a) is determined to be a foreign mobile subscriber;

(c) determining whether the service provider of the foreign mobile subscriber is a roaming service provider by checking a service provider index table after determining that roaming service for a country of the foreign mobile subscriber is established by checking the country code identified in step (b); and (d) providing service to the foreign mobile subscriber while managing the corresponding number in the order of the country code index table number, the service provider index table number and a mobile station identification number (MIN) after determining that the service provider of the foreign mobile subscriber is a roaming service provider identified in step (c).

In an aspect of the above embodiment, step (b) includes not providing service by discarding the call request from the foreign mobile subscriber when the country code of the foreign mobile subscriber does not exist in the country code index table.

According to the invention, upon receipt of a call request from a mobile terminal, checking a mobile country code (MCC) and a mobile network code (MNC) of an international mobile subscriber identification (IMSI) number received from the mobile terminal, determining whether a subscriber of the mobile terminal is a foreign mobile subscriber; checking, when the subscriber is a foreign mobile subscriber, a country code index table of the VLR to determine whether there exists a number of the country for which the roaming service is established; checking, when there exists the number of the country for which the roaming service is established, a service provider index table to determine whether the service provider is a roaming service provider; and providing, when the service provider is a roaming service provider, the service while managing the corresponding number in the order of the country code index table number, the service provider index table number and a mobile station identification number (MIN).

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. For the purpose of clarity, well-known functions or constructions are not described in detail as they would obscure the invention in unnecessary detail.

Figure 3A:
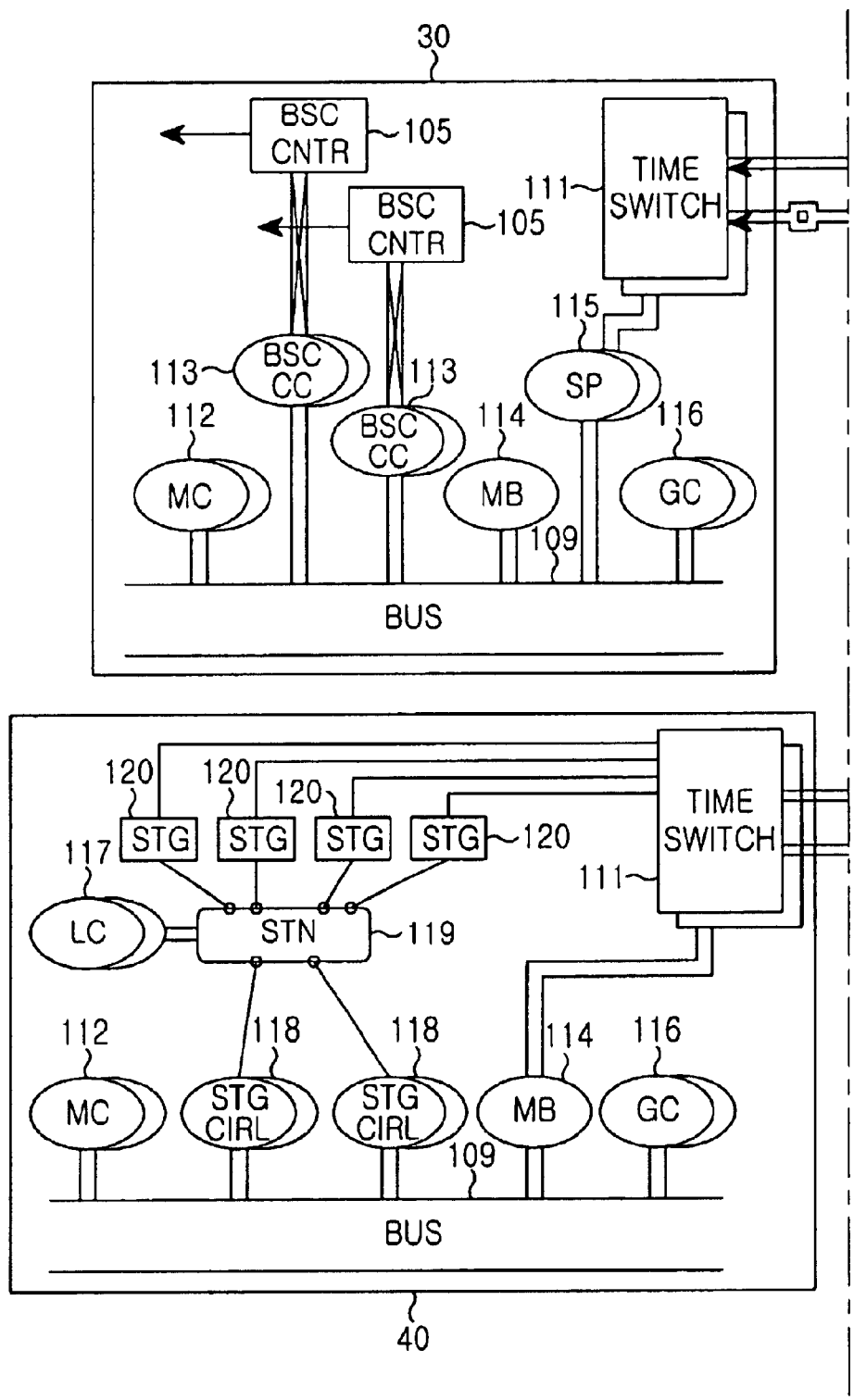
FIGS. 3A to 3C are detailed block diagrams illustrating the MSC and the VLR.
Figure 3B:
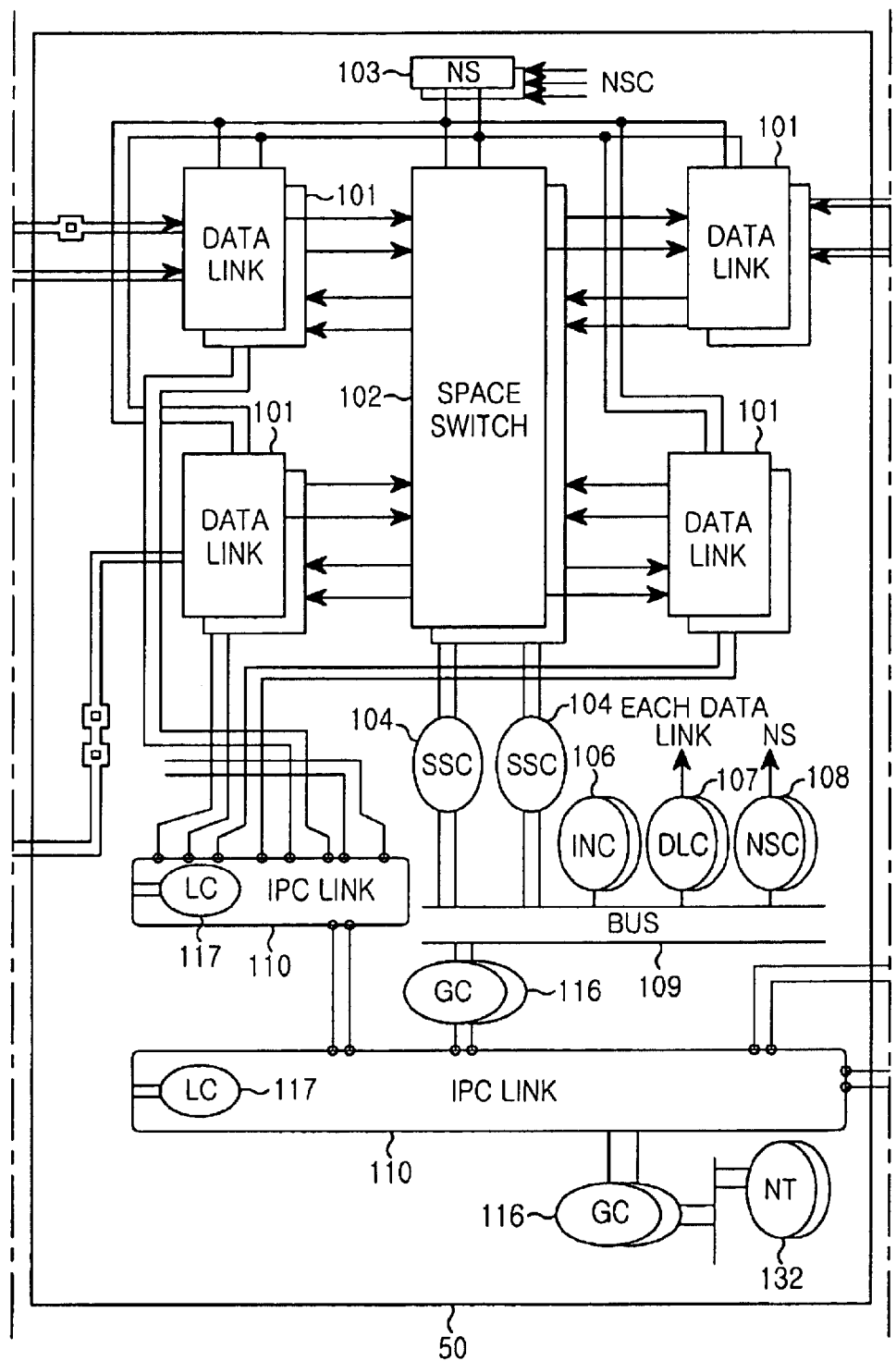
Figure 3C:
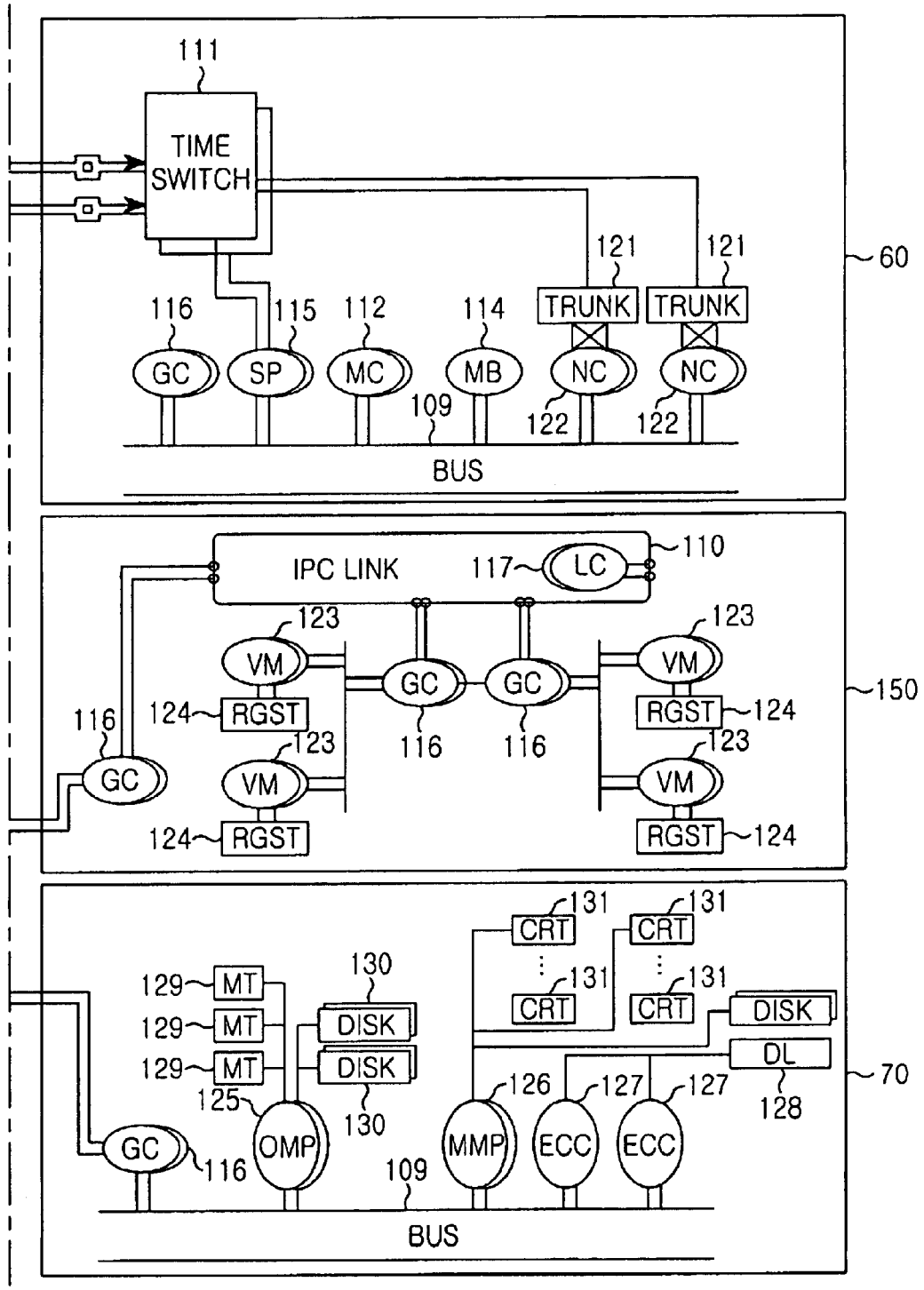

FIGS. 3A to 3C illustrate a detailed block diagram of an MSC and a VLR connected thereto. The structure and operation of the MSC and the VLR will be described in detail below with reference to FIG. 3.

The MSC 100 is comprised of a subscriber unit 30, a No. 7 signaling processor 40, a trunk unit 60, an operating/managing unit 70, and a central unit 50 including a space switch 102.

First, the structure and operation of the MSC 100 will be described.

A description of the structure and operation of the central unit 50 will first be made. The central unit 50 includes a plurality of data links 101 through which data exchange is performed among the subscriber unit 30, the No. 7 signaling processor 40, the trunk unit 60 and the operating/managing unit 70. Moreover, the space switch 102 performs a switching operation for connecting a call. A network synchronizer (NS) 103 generates a sync (synchronization) signal and provides the generated sync signal to each part of the MSC. A space switch controller (SSC) 104 controls a switching operation of the space switch 102, and an internal network controller (INC) 106 controls the connection with processors of respective controllers connected to a bus 109. A data link controller (DLC) 107 controls the respective data links 101, and a network sync controller (NSC) 108 controls the network synchronizer 103 to normally output a clock. An IPC (Inter-Processor Communication) link 110 controls inter-processor communication performed between the respective processors, and can transmit/receive data under the control of a link controller (LC) 117. Furthermore, a gate controller (GC) 116 controls data exchange between the bus 109 and the IPC link 110, and a number translator (NT) 132 translates a number that the roaming subscriber or the normal subscriber has dialed, and then performs routing.

A description of the structure and operation of the subscriber unit 30 will now be made. BSC connectors (BSC_CNTR) 105 provide interfacing with the BSCs, and BSC connection controllers (BSC_CC) 113 control the BSC connectors 105. Further, a main controller (MC) 112 controls the overall operation of the subscriber unit 30, and a maintenance block (MB) 114 maintains the subscriber unit 30. A switch processor (SP) 115 controls a time switch 111, and the time switch 111 is connected to the central unit 50 and performs a data exchange operation. A gate controller (GC) 116 controls data to be loaded on the bus 109.

A description of the structure and operation of the No.7 signaling processor 40 will now be made. The No. 7 signaling processor 40 includes a time switch 111, a main controller 112, a maintenance block 114, a gate controller 116, an STG (Signaling Terminal Group) controller (STG_CTRL) 118 for controlling No. 7 signal processing, a plurality of STGs (120) for performing No. 7 signal processing, and an STN (Signaling Terminal Network block) 119 for performing data exchange between the STG controller 118 and the STGs 120.

A description of the structure and operation of the trunk unit 60 will now be made. The trunk unit 60 includes a time switch 111, a gate controller 116, a switch processor 115, a main controller 112, a maintenance block 114, a bus 109 for connecting the above-stated processors, trunks 121 for connecting with other networks, and network connectors (NCs) 122 for controlling the associated trunks 121.

Finally, a description of the structure and operation of the operating/managing unit 70 will be made. A gate controller 116 controls data exchange between the central unit 50 and the operating/managing unit 70. Moreover, the gate controller 116 controls inter-processor communication through the bus 109 included in the operating/managing unit 70. An OMP (Operating Maintenance Processor) 125 stores data for maintaining and managing the MSC 100 in magnetic tapes (MTs) 129 or disks 130. Further, an MMP (Man-Machine Processor) 126 is connected to a plurality of externally connected CRTs (Cathode Ray Tubes) 131 and processes a received operator's command. Externally connected controllers (ECC) 127 perform data exchange with other external devices through a data link (DL) 128.

Next, the structure and operation of the VLR 150 will be described. The VLR 150 is connected to the MSC 100 through the IPC link 110 of the central unit 50, and exchanges data with the IPC link 110 through a gate controller 116. The gate controller 116 included in the VLR 150 is connected to the IPC link 110, and the IPC link 110 transmits data under the control of the link controller 117. Further, the data loaded on the IPC link 110 is output to respective visitor managers (VM) 123 through the different gate controllers 116. Through this, the visitor managers 123 read the data stored in registers 124 and perform the corresponding operations.

Figure 4:
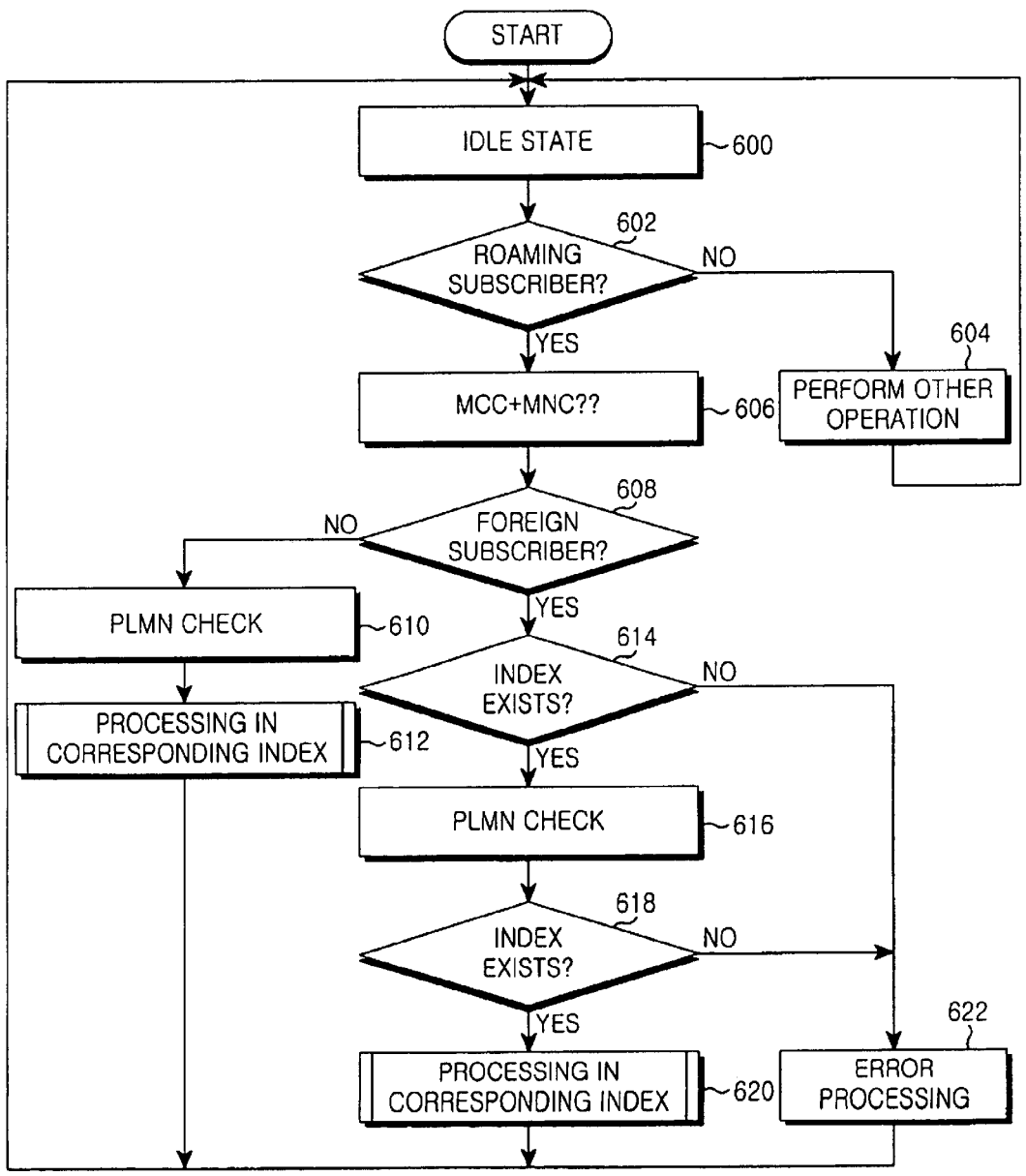
FIG. 4 is a flow chart illustrating the procedure performed when a foreign mobile subscriber requests a call according to the embodiment of the present invention.

FIG. 4 illustrates a method for managing a foreign mobile subscriber according to an embodiment of the present invention, when the foreign mobile subscriber requests a call.

Figure 1:
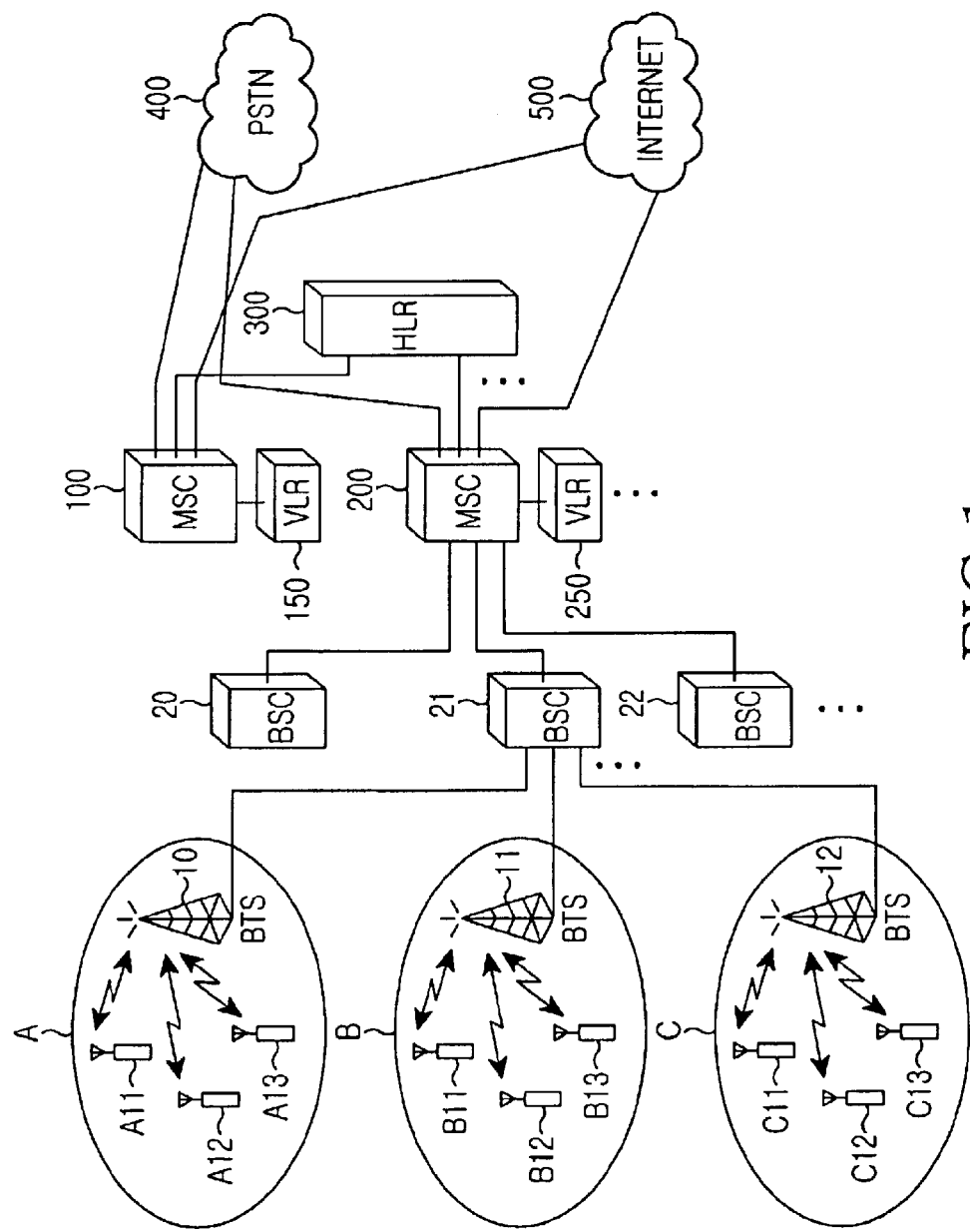
FIG. 1 is a diagram illustrating a MSC network structure including the VLR and the HLR.

Now, with reference to FIGS. 1 and 3, a detailed description will be made of a procedure for establishing a call to the foreign mobile subscriber and a method for managing data in the VLR according to an embodiment of the present invention. The embodiment of the present invention will be described with reference to the MSC 100 on the assumption that data is stored in the VLR 150.

The MSC 100 maintains an idle state in step 600, and proceeds to step 602 when a specific event occurs. The MSC 100 determines in step 602 whether the event is a service request for a roaming subscriber of a mobile terminal, by checking the IMSI number transmitted from the mobile terminal. That is, when the event is a call processing request signal from the BTS and it is determined by the BTS or BSC that the mobile subscriber is a foreign mobile subscriber, the corresponding data is transmitted for IMSI number checking. When the event is a roaming subscriber's call in step 602, the MSC 100 proceeds to step 606. Otherwise, the MSC 100 proceeds to steps 604 to perform other operation and then returns to step 600. In step 606, the MSC 100 checks the MCC number and the MNC number of the IMSI number received from the BTS. This is to verify whether the results determined as the roaming subscriber's call by the BTS or the BSC are correct or not. However, when the IMSI number is directly received at the MSC 100 without verification of the roaming call from the BTS or the BSC, the step 602 can be skipped.

Figure 2:
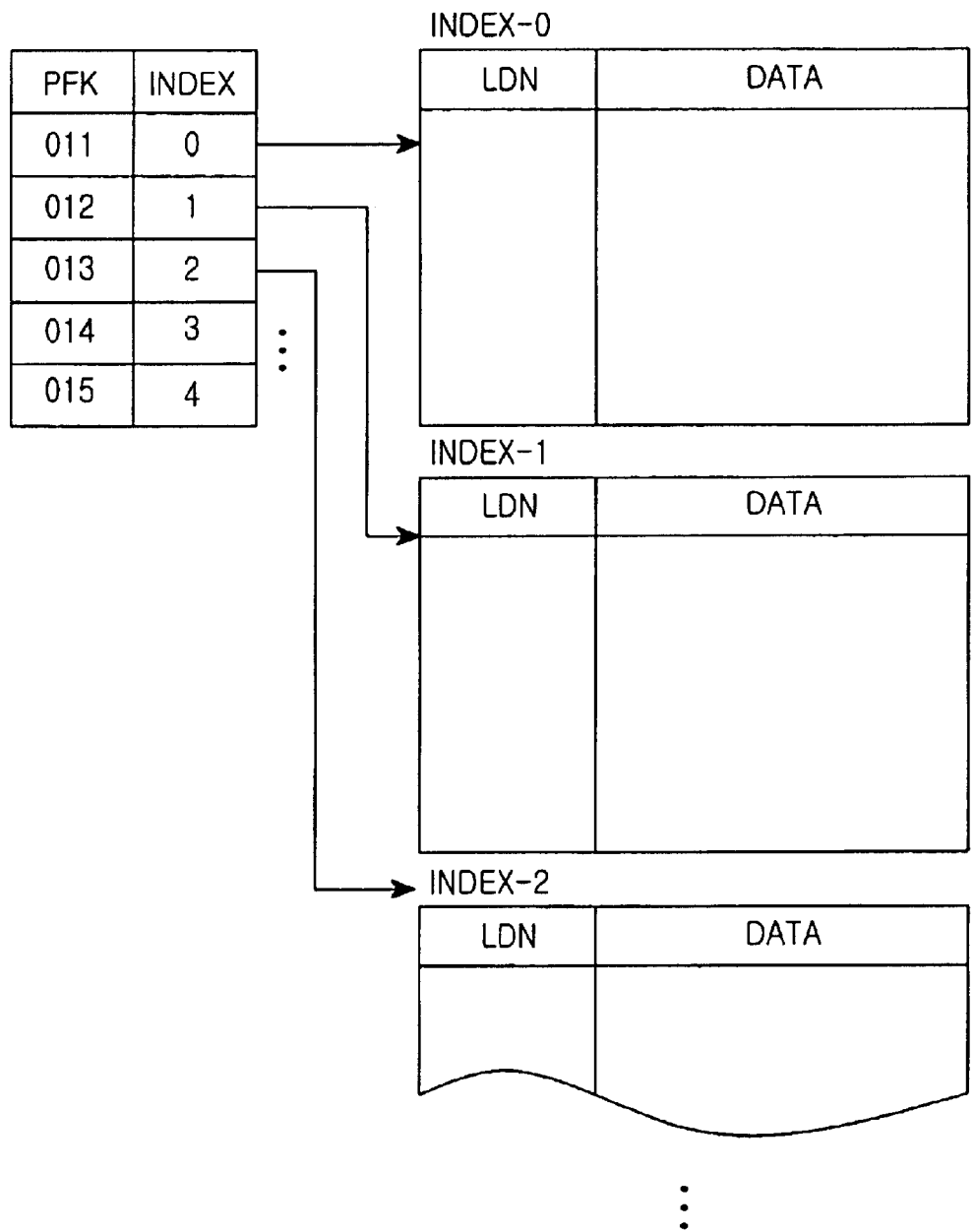
FIG. 2 is a table diagram for explaining a location registration and the search routine of a mobile terminal in the VLR according to the prior art.

When the subscriber is determined as a foreign subscriber in step 608 as the result of checking the MCC and MNC numbers, the MSC 100 proceeds to step 614, and when the subscriber is not a foreign subscriber, the MSC 100 proceeds to step 610. In step 610, the MSC 100 checks the succeeding PLMN number. According to the check results, the MSC 100 determines in step 612, whether to process the call in the corresponding index as described with reference to FIG. 2. Otherwise, when the subscriber is a foreign subscriber, the MSC 100 determines in step 614 whether there exists an index according to the MCC and MNC check results. When there exists the corresponding index, the MSC 100 proceeds to step 616. Otherwise, the MSC 100 proceeds to step 622 to perform error processing.

Here, a detailed description will be made of a method for searching an index of the foreign subscriber.

In the registers 124 of the VLR 150, a memory area assigned to the numbers for managing the subscribers is $2^{32}$. Therefore, an integer permitted by the registers 124 of the VLR 150 should be in a range between −2147483648 and 2147483647. Therefore, a number of 1 to 20 can be used as a prefix for searching the index, so that it is possible to provide a roaming service in connection with 20 foreign service providers. In addition, a table stored in the VLR 150 of FIG. 1 further includes one prefix index according to the present invention. Such a prefix index is shown in Table 2 below.

TABLE 2

| PFX | INDEX |
|---|---|
| 45212 | 0 |
| 32145 | 1 |
| . | . |
| . | . |
| . | . |

The number used for the prefix PFX becomes the MCC number and the MNC number shown in Table 1. By using the MCC number and the MNC number, an index table for the country code is further included. That is, when there exists a country code in the index of Table 2, the MSC 100 proceeds to step 616, and otherwise, proceeds to step 622. In step 622, the MSC 100 performs error processing on the call, i.e., does not process the call. However, in step 616, the MSC 100 checks the index table according to PLMN. Such an index table for PLMN is shown in Table 3 below.

TABLE 3

| PFX | INDEX |
|---|---|
| 016 | 0 |
| 018 | 1 |
| . | . |
| . | . |
| . | . |
| 111 | 9 |

That is, such a PLMN table is checked in order to determine whether the number is a number of the service provider which has set the roaming service to the corresponding country. That is, the MSC 100 request the VLR 150 to check the PLMN. Thereafter, the MSC 100 determines in step 618 whether there exists an index in the service provider table of Table 3. In addition, when the existing register is used as stated above, the index table has a value of 0 to 9 according to the range of integer.

When there exists an index, the MSC 100 proceeds to step 620, and otherwise, proceeds to step 622 to perform error processing. In step 620, the MSC 100 performs the roaming subscriber's service in the corresponding index.

A description of the invention will be made with reference to a case where the IMSI number of the mobile terminal is "321 45 018 123 4567". Upon receipt of the number from the mobile station, the MSC 100 checks a country code through the visitor manager 123 of the VLR 150. That is, the MSC 100 determines whether the number "321 45" exists in the foreign country code index table shown in Table 2. Since the foreign country code index table has the index code 1 for the number "321 45", the MSC 100 checks the next number "018". Since there exists the index number 1 for the number "018", the MSC 100 performs the service for the number and processes the service in the corresponding index table. Therefore, the foreign subscriber's address for the above number is "11 123 4567".

Figure 5:
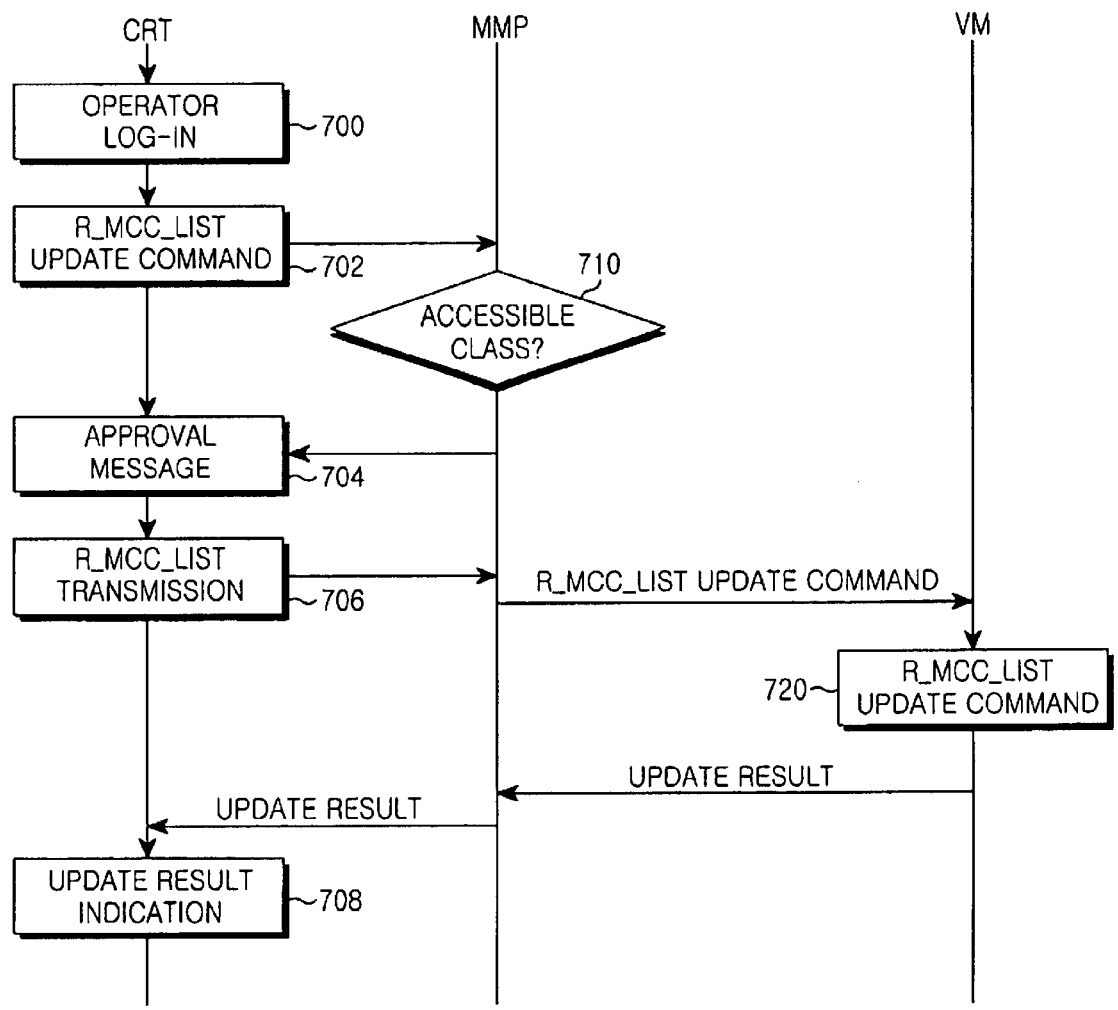
FIG. 5 is a signal flow diagram illustrating the procedure for storing roaming service data in the VLR of the MSC according to the embodiment of the present invention.

FIG. 5 illustrates a procedure for storing the roaming service data in the VLR of the MSC according to an embodiment of the present invention.

With reference to FIG. 5, the user logs the operator in the CRT 131 in step 700, and inputs a command for changing the table R_MCC_LIST of Table 2 and Table 3 in step 702. Such changing includes inputting new data, and updating and deleting the input data. Upon receipt of the change command, the CRT 131 transmits to the MMP 126 the operator's class together with the corresponding command. The MMP 126 then checks the operator's class and determines in step 710 whether the operator's class is an accessible class. When the operator's class is an accessible class, the MMP 126 transmits an approval message to the CRT 131 in step 704. Through this, the CRT 131 transmits the table R_MCC_LIST input by the operator to the MMP 126 in step 706. The MMP 126 then transmits corresponding update command data to the visitor manager 123 of the VLR 150. The visitor manager 123 then updates the previously stored data of the table R_MCC_LIST in step 720, and transmits the resulting data to the MMP 126. The MMP 126 then transmits the update result to the CRT 131, and the CRT 131 displays the received update result on the screen in step 708.

As described above, the novel method can provide a roaming service to the foreign mobile subscriber and manage the foreign mobile subscriber by adding a table for searching the prefix and a corresponding search routine, while maintaining the database in the register.

While the invention has been shown and described with reference to a certain preferred embodiment thereof, it will be understood by those skilled in the art that various changes in form and details may be made therein without departing from the spirit and yjr scope of the invention as defined by the appended claims.

What is claimed is:

1. A method for managing a foreign mobile subscriber in a visitor location register (VLR) of a mobile switching center (MSC) to provide a roaming service, comprising the steps of:
   (a) upon receipt of a call request from a mobile terminal, determining whether a subscriber of the mobile terminal is a foreign mobile subscriber by checking a mobile country code (MCC) and a mobile network code (MNC) of an international mobile subscriber identification (IMSI) number received from the mobile terminal;
   (b) determining whether roaming service is established for a country of the foreign mobile subscriber by checking if a number of a country code received from the foreign mobile subscriber exists in a country code index table of the VLR when the subscriber in step (a) is determined to be a foreign mobile subscriber;
   (c) determining whether the service provider of the foreign mobile subscriber is a roaming service provider by checking a service provider index table after determining that roaming service for a country of the foreign mobile subscriber is established by checking the country code identified in step (b); and
   (d) providing service to the foreign mobile subscriber while managing the corresponding number in the order of the country code index table number, the service provider index table number and a mobile station identification number (MIN) after determining that the service provider of the foreign mobile subscriber is a roaming service provider identified in step (c).

2. The method as claimed in claim 1, wherein step (b) includes not providing service by discarding the call request from the foreign mobile subscriber when the country code of the foreign mobile subscriber does not exist in the country code index table.

3. The method as claimed in claim 2, wherein the country code index table comprises a table in which a prefix is comprised of the MCC and the MNC of the IMSI, and the table has an index value corresponding to the roaming service country code.

4. The method as claimed in claim 3, wherein the service provider index table has an index value corresponding to a public land mobile network (PLMN) value of the IMSI number.

5. The method as claimed in claim 1, wherein the country code index table comprises a table in which a prefix is comprised of the MCC and the MNC of the IMSI, and the table has an index value corresponding to the roaming service country code.

6. The method as claimed in claim 5, wherein the service provider index table has an index value corresponding to a public land mobile network (PLMN) value of the IMSI number.

\* \* \* \* \*